United States Patent [19]

Hasebe et al.

[11] Patent Number: 4,522,540
[45] Date of Patent: Jun. 11, 1985

[54] METHOD AND APPARATUS FOR REMOVING CUTTING BURR STICKING TO LOWER SURFACE OF SLAB

[75] Inventors: Nobuhisa Hasebe; Hiroshi Kawada, both of Yokohama; Naoki Yokoyama; Shigeki Komori, both of Kawasaki, all of Japan

[73] Assignee: Nippon Kokan Kabushiki Kaisha, Tokyo, Japan

[21] Appl. No.: 475,889

[22] Filed: Mar. 16, 1983

[30] Foreign Application Priority Data

Apr. 9, 1982 [JP] Japan .................................. 57-58276
Apr. 9, 1982 [JP] Japan .................................. 57-58277

[51] Int. Cl.³ ........................ B23D 1/00; B23D 1/26
[52] U.S. Cl. ................................. 409/293; 409/300; 409/308; 409/319; 409/329
[58] Field of Search ............... 409/297, 298, 300, 301, 409/140, 308, 309, 312, 329, 293, 303, 310, 311, 409/317, 319; 228/13; 164/263, 704

[56] References Cited

U.S. PATENT DOCUMENTS

| | | | |
|---|---|---|---|
| 1,508,513 | 9/1924 | Field | 409/308 |
| 2,120,316 | 6/1938 | Stone | 228/5.7 |
| 2,272,737 | 2/1942 | Chapman | 409/300 |
| 3,541,923 | 11/1970 | Saigo et al. | 409/293 X |
| 3,543,637 | 12/1970 | Englisch | 409/297 |
| 3,602,095 | 8/1971 | Bocharov et al. | 409/303 |
| 3,954,044 | 5/1976 | Ridgway | 409/226 |
| 4,362,448 | 12/1982 | Hasebe et al. | 409/300 |
| 4,443,143 | 4/1984 | Asari et al. | 409/298 |

FOREIGN PATENT DOCUMENTS

| | | | |
|---|---|---|---|
| 1225468 | 9/1966 | Fed. Rep. of Germany | 409/300 |
| 2849208 | 5/1980 | Fed. Rep. of Germany | 409/300 |
| 56-60568 | 5/1981 | Japan . | |

Primary Examiner—William R. Briggs
Assistant Examiner—Glenn L. Webb
Attorney, Agent, or Firm—Frishauf, Holtz, Goodman & Woodward

[57] ABSTRACT

A method and an apparatus for removing a cutting burr produced when longitudinally fusion-cutting a slab and sticking to the lower surface of the slab along the fusion-cutting line, which comprise placing a slab having the cutting burr on a roller table comprising a plurality of rollers and horizontally extending with the lower surface having the cutting burr of the slab down so that the line of the cutting burr agrees with the travelling direction of the roller table; lifting a cutter of a burr cutting machine provided below the roller table to bring the cutter into contact with the lower surface having the cutting burr of the slab; horizontally moving the cutter toward the line of the cutting burr of the slab until the cutter passes the line of the cutting burr while keeping the contact with the lower surface of the slab, to cut off a part of the cutting burr by a length corresponding to the total length of a knife of the cutter by means of the knife of the cutter, and, horizontally pulling the cutter back to the original position thereof; forwarding the slab on the roller table in the travelling direction of the roller table by a distance substantially equal to the total length of the knife of the cutter; and, repeating at least once the cut-off of the cutting burr of the slab by means of the cutter, thereby substantially completely removing the cutting burr of the slab.

4 Claims, 10 Drawing Figures

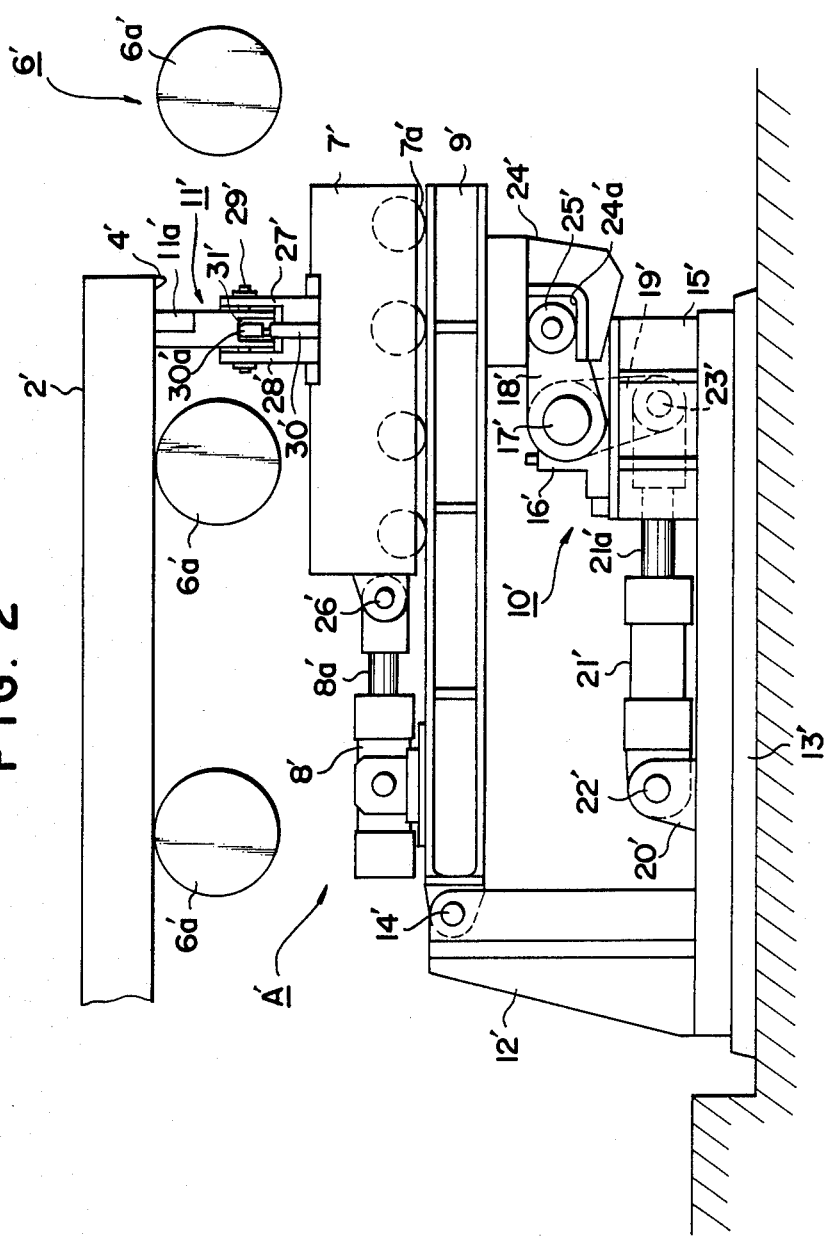

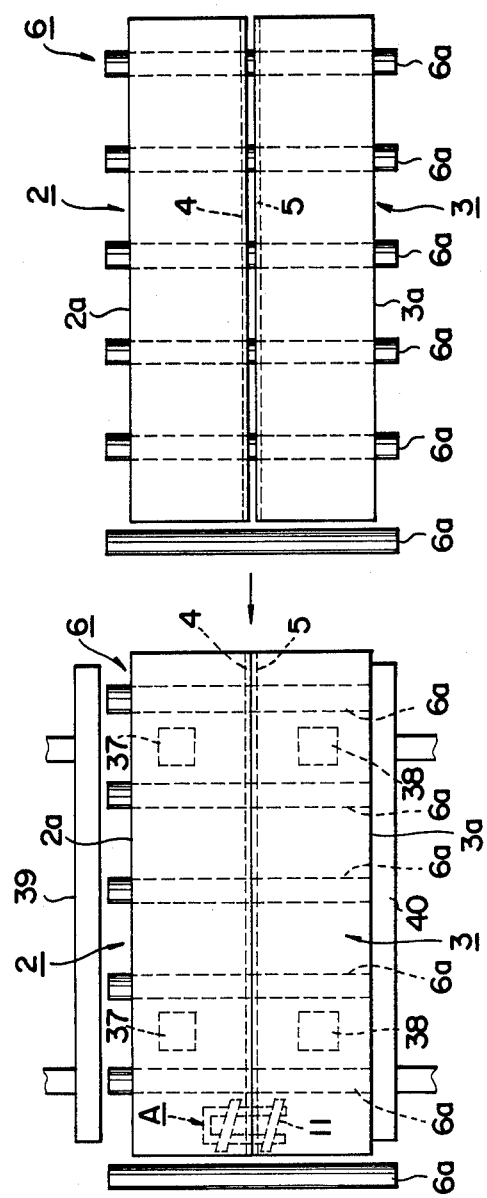

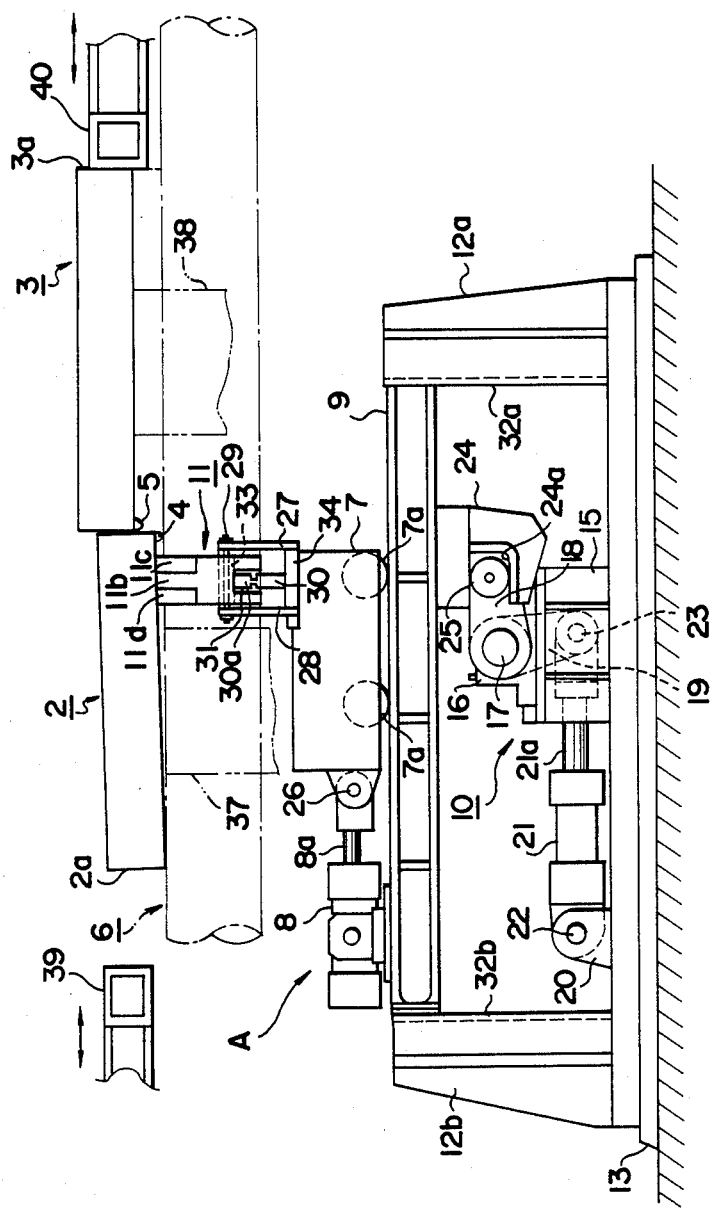

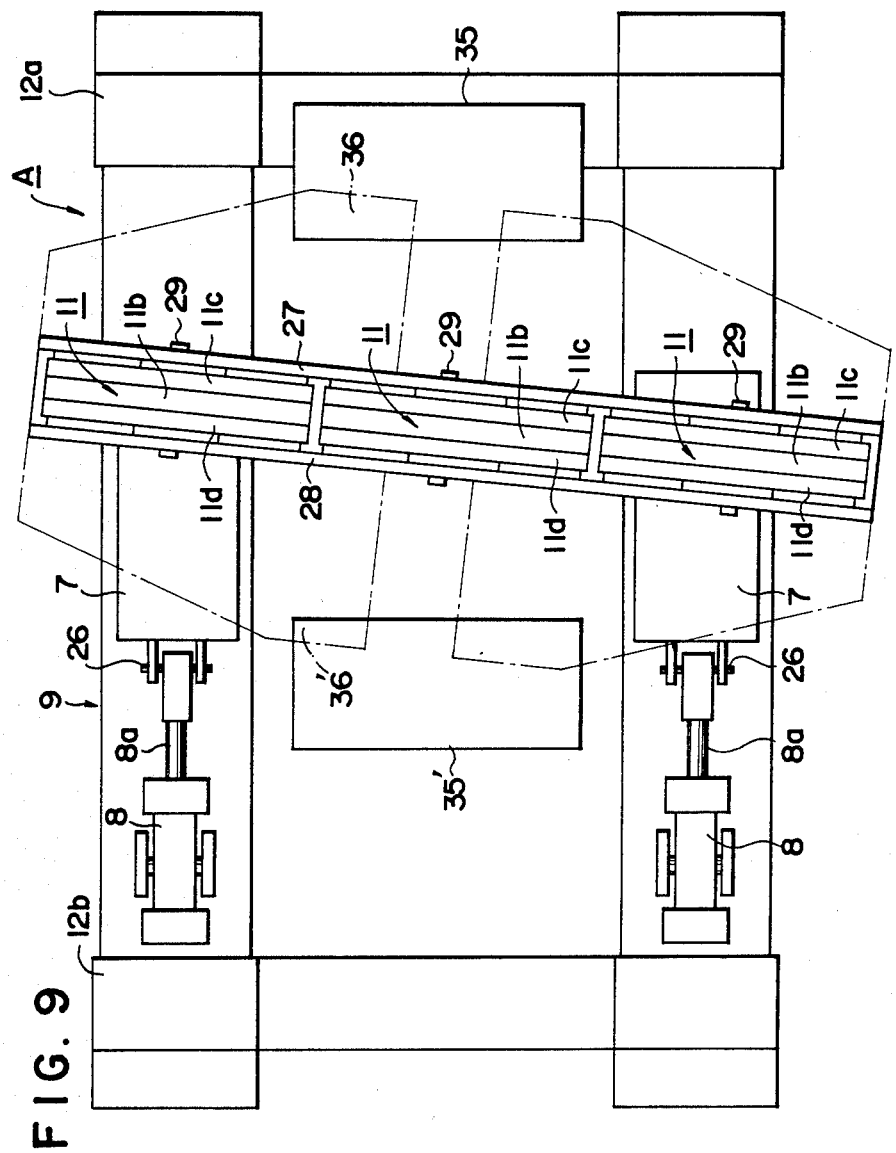

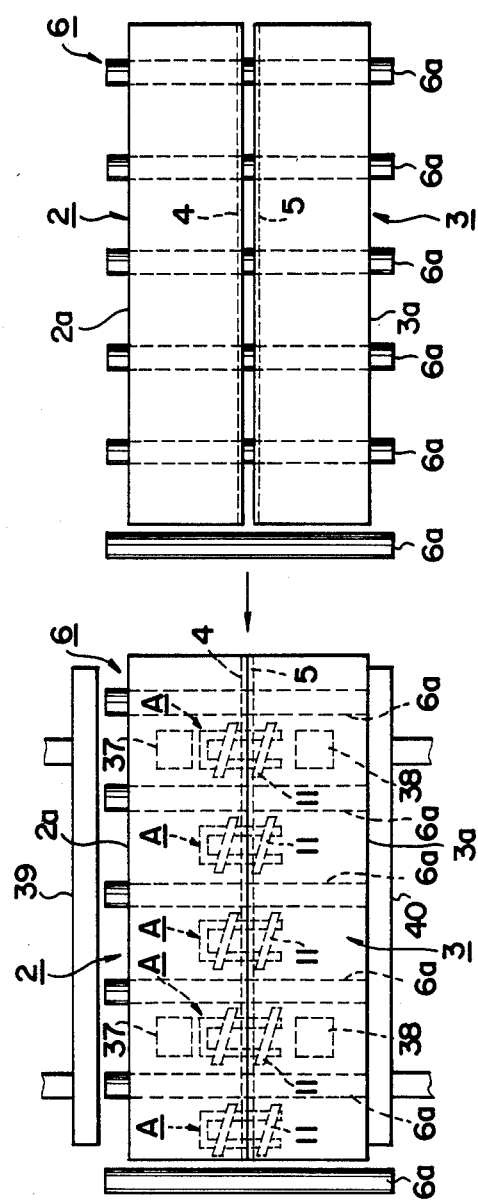

METHOD AND APPARATUS FOR REMOVING CUTTING BURR STICKING TO LOWER SURFACE OF SLAB

REFERENCE TO PATENTS, APPLICATIONS AND PUBLICATIONS PERTINENT TO THE INVENTION

Japanese Utility Model Provisional Publication No. 60568/81 dated May 23, 1981 which is discussed hereafter under the caption of the "BACKGROUND OF THE INVENTION".

FIELD OF THE INVENTION

The present invention relates to a method and an apparatus for removing at a high efficiency a cutting burr which is produced when longitudinally fusion-cutting a slab and sticks to the lower surface of said slab along the fusion-cutting line.

BACKGROUND OF THE INVENTION

For the purpose of manufacturing a narrow slab such as a material for a thin sheet, a method is known which comprises transversely cutting a wide strand cast in a continuous casting machine at a certain length to prepare a wide slab, and then, longitudinally fusion-cutting said wide slab to manufacture a plurality of narrow slabs. According to this method, it is possible to improve the casting efficiency of a cast strand in a continuous casting machine.

When manufacturing two narrow slabs, a first slab 2 and a second slab 3, by longitudinally fusion-cutting a wide slab 1, as shown in FIG. 1, by the method described above, a cutting burr 4 sticks to the lower surface of the first slab 2, and a cutting burr 5 sticks to the lower surface of the second slab 3.

When rolling the first slab 2 having the cutting burr 4 and the second slab 3 having the cutting burr 5, flaws are produced in the rolled products, resulting in defective products and a lower product yield. It is therefore necessary to fully remove the cutting burr 4 sticking to the lower surface of the first slab 2 and the cutting burr 5 sticking to the lower surface of the second slab 3 before rolling thereof. However, since the removal of the cutting burrs 4 and 5 has so far been manually carried out with the use of a cutter or a hot scarfer handled by an operator, the efficiency has been very low, thus impairing smooth manufacture of slabs.

Japanese Utility Model Provisional Publication No. 60568/81 dated May 23, 1981 (hereinafter referred to as the "prior art") discloses an apparatus for removing a cutting burr sticking to the lower surface of a slab along the fusion-cutting line. The prior art is described below with reference to FIG. 2.

In FIG. 2, 6' is a roller table which comprises a plurality of rollers 6a' and extends horizontally for placing a slab 2' having a cutting burr 4' on the lower surface thereof along the fusion-cutting line with the lower surface down, and transferring the slab 2' thereon. The slab 2' is placed on the roller table 6' with the line of the cutting burr 4' intersecting perpendicularly the travelling direction of the roller table 6'.

In FIG. 2, A' is a burr cutting machine provided below the roller table 6' for removing the cutting burr 4' of the slab 2'. The burr cutting machine A' comprises a cutter carriage 7' horizontally moving toward the line of the cutting burr 4' of the slab 2', a cutter carriage driving mechanism 8' connected to the cutter carriage 7', a horizontal stand 9' for mounting the cutter carriage 7' and the cutter carriage driving mechanism 8', and a stand lifting mechanism 10' fitted to the lower portion of the horizontal stand 9' for lifting the horizontal stand 9' together with the cutter carriage 7' and the cutter carriage driving mechanism 8'. The cutter carriage 7' has at the top thereof at least one cutter 11', and each of the at least one cutter 11' has a knife 11a' for cutting off the cutting burr 4' of the slab 2'. Also in FIG. 2, 12' are a pair of supporting legs vertically provided on a base 13', and an end of the horizontal stand 9' is connected by a shaft 14' to the top portion of the pair of supporting legs 12'. A slab fixing mechanism (not shown) for fixing the slab 2' onto the roller table 6' during cutting off the cutting burr 4' of the slab 2', is provided near the burr cutting machine A'.

The stand lifting mechanism 10' has the following construction. In FIG. 2, 15' is a rack fixed onto the base 13', 16' is a bearing fixed onto the rack 15', and 17' is a shaft inserted horizontally into the bearing 16'. An end of a first arm 18' extending substantially horizontally and an end of a second arm 19' extending substantially vertically are respectively fixed to the shaft 17' so that the first arm 18' and the second arm 19' form an angle of about 90° therebetween. In the same figure, 20' is a bracket fixed onto the base 13', and 21' is a cylinder connected by a shaft 22' substantially horizontally to the bracket 20', the tip of a rod 21a' of the cylinder 21' being connected by a shaft 23' to the other end of the second arm 19'. A jaw member 24' having a jawshaped engaging portion 24a' is fixed to the lower portion of the horizontal stand 9', and a roller 25' fitted to the other end of the first arm 18' is engaged with the jawshaped engaging portion 24a' of the jaw member 24'. Since the stand lifting mechanism 10' has the construction as described above, it is possible to lift the horizontal stand 9' via the first arm 18 and the second arm 19, with the shaft 14' provided at the top of the supporting leg 12' as the fulcrum by causing the rod 21a' to expand through actuation of the cylinder 21', and to lower the horizontal stand 9' by causing the rod 21a' to contract through actuation of the cylinder 21'.

The cutter carriage driving mechanism 8' comprises a cylinder provided substantially horizontally on the upper surface of the horizontal stand 9', and the tip of a rod 8a' of the cylinder is connected by a shaft 26' to the cutter carriage 7' having wheels 7a'. It is therefore possible to forward, the cutter carriage 7' on a rail (not shown) provided on the horizontal stand 9', by causing the rod 8a' to expand through actuation of the cutter carriage driving mechanism 8', and to retreat the cutter carriage 7' by causing the rod 8a' to contract.

In FIG. 2, 27' and 28' are a pair of cutter supporting members fixed onto the top portion of the cutter carriage 7'. Each of the at least one cutter 11' is attached between the pair of cutter supporting members 27' and 28' by means of a shaft 29' inserted into an elliptic hole (not shown) formed in each of the at least one cutter 11' so that each of the at least one cutter 11' can be vertically moved by a distance equal to a play between the elliptic hole and the shaft 29'. In the same figure, 30' is at least one cylinder provided substantially vertically on the top portion of the cutter carriage 7', and the tip of a rod 30a' of the at least one cylinder 30' is in contact with a recess 31' formed at the lower portion of each of the at least one cutter 11'. Therefore, it is possible to vertically move the at least one cutter 11' by a distance equal to a play between the elliptic hole and the shaft 29' by actuating the at least one cylinder 30'.

Now, operation of the above-mentioned apparatus of the prior art is described. A slab 2' placed on the roller table 6' with the lower surface having the cutting burr 4' of the slab 2' down, is fixed onto the roller table 6' by the slab fixing mechanism (not shown). Then, the cutter 11' is brought into contact with the lower surface having the cutting burr 4' of the slab 2' by actuating the stand lifting mechanism 10' of the burr cutting machine A' to lift the horizontal stand 9', and actuating the cylinder 30' on the cutter carriage 7' to lift the cutter 11'. Then, the cutter 11' is horizontally moved, while keeping the contact with the lower surface of the slab 2', toward the line of the cutting burr 4' until the cutter 11' passes the line of the cutting burr 4' by actuating the cutter carriage driving mechanism 8' to forward the cutter carriage 7' toward the cutting burr 4, whereby the cutting burr 4' of the slab 2' placed on the roller table 6' is cut off by the knife 11a' of the cutter 11'.

Since in the above-mentioned prior art, the cutting burr 4' is substantially completely removed by a single movement of the cutter 11', it is suitable for removing a cutting burr shorter than the total length of the knife 11a' of the cutter 11' such as a cutting burr produced when fusion-cutting the slab in the width direction thereof and sticking to the lower surface thereof, but the prior art is not applicable to removal of a cutting burr longer than the total length of the knife 11a' of the cutter 11' such as a cutting burr produced when fusion-cutting the slab in the longitudinal direction thereof and sticking to the lower surface thereof.

Under such circumstances, there is a strong demand for developing a method and an apparatus which enable to remove at a high efficiency a cutting burr which is produced when longitudinally fusion-cutting a slab and sticks to the lower surface of the slab along the fusion-cutting line, but such a method and an apparatus have not as yet been proposed.

SUMMARY OF THE INVENTION

An object of the present invention is therefore to provide a method and an apparatus which enable to remove at a high efficiency a cutting burr which is produced when longitudinally fusion-cutting a slab and sticks to the lower surface of the slab along the fusion-cutting line.

In accordance with one of the features of the present invention, there is provided a method for removing a cutting burr produced when longitudinally fusion-cutting a slab and sticking to the lower surface of said slab along the fusion-cutting line, which comprises the steps of:

placing at least one slab each having said cutting burr on a roller table extending horizontally with the lower surface having said cutting burr of said at least one slab down; fixing said at least one slab onto said roller table; lifting at least one cutter of at least one burr cutting machine provided below said roller table to bring said at least one cutter into contact with said lower surface having said cutting burr of said at least one slab; and horizontally moving said at least one cutter toward the line of said cutting burr of said at least one slab while keeping said contact with said lower surface to cut off said cutting burr by means of a knife of said at least one cutter;

characterized by:

placing a slab having said cutting burr on said roller table so that the line of said cutting burr agrees with the travelling direction of said roller table;

transferring said slab on said roller table up to the position of said at least one burr cutting machine, and fixing said slab onto said roller table;

horizontally moving said at least one cutter of said at least one burr cutting machine toward the line of said cutting burr of said slab in the direction intersecting the travelling direction of said roller table substantially at right angles until said at least one cutter passes the line of said cutting burr, to cut off a part of said cutting burr of said slab by a length corresponding to the total length of a knife of said at least one cutter by means of said knife of said at least one cutter, and horizontally pulling said at least one cutter back to the original position thereof;

after releasing said fixing of said slab, fowarding said slab on said roller table in the travelling direction of said roller table by a distance substantially equal to said total length of said knife of said at least one cutter; and, repeating at least once said cut-off of said cutting burr of said slab by means of said at least one cutter, thereby substantially completely removing said cutting burr of said slab.

BRIEF DESCRIPTION OF THE DRAWINGS

FIG. 2 is a schematic front view illustrating the apparatus of the prior art;

FIG. 7 is a schematic explanatory view illustrating further another embodiment of the method of the present invention, in which one burr cutting machine is used;

FIG. 8 is a schematic front view illustrating another embodiment of the apparatus of the present invention;

FIG. 9 is a schematic plan view of the apparatus of the present invention illustrated in FIG. 8; and, FIG. 10 is a schematic explanatory view illustrating further another embodiment of the method of the present invention, in which a plurality of burr cutting machines are used.

DETAILED DESCRIPTION OF PREFERRED EMBODIMENTS

With a view to solving the above-mentioned problems involved in the removal of a cutting burr produced when longitudinally fusion-cutting a slab and sticking to the lower surface of the slab along the fusion-cutting line, we carried out extensive studies. As a result, wr have developed a method for removing a cutting burr produced when longitudinally fusion-cutting a slab and sticking to the lower surface of said slab along the fusion-cutting line, which comprises the steps of:

placing at least one slab each having said cutting burr on a roller table extending horizontally with the lower surface having said cutting burr of said at least one slab down; fixing said at least one slab onto said roller table; lifting at least one cutter of at least one burr cutting machine provided below said roller table to bring said at least one cutter into contact with said lower surface having said cutting burr of said at least one slab; and horizontally moving said at least one cutter toward the line of said cutting burr of said at least one slab while keeping said contact with said lower surface to cut off said cutting burr by means of a knife of said at least one cutter;

characterized by:

placing a slab having said cutting burr on said roller table so that the line of said cutting burr agrees with the travelling direction of said roller table;

transferring said slab on said roller table up to the position of said at least one burr cutting machine, and fixing said slab onto said roller table;

horizontally moving said at least one cutter of said at least one burr cutting machine toward the line of said cutting burr of said slab in the direction intersecting the travelling direction of said roller table substantially at right angles until said at least one cutter passes the line of said cutting burr, to cut off a part of said cutting burr of said slab by a length corresponding to the total length of a knife of said at least one cutter by means of said knife of said at least one cutter, and horizontally pulling said at least one cutter back to the original position thereof;

after releasing said fixing of said slab, forwarding said slab on said roller table in the travelling direction of said roller table by a distance substantially equal to said total length of said knife of said at least one cutter; and, repeating at least once said cut-off of said cutting burr of said slab by means of said at least one cutter, thereby substantially completely removing said cutting burr of said slab.

Now, the method and the apparatus of the present invention for removing a cutting burr sticking to the lower surface of a slab along the fusion-cutting line are described with reference to the drawings.

Figure 1:
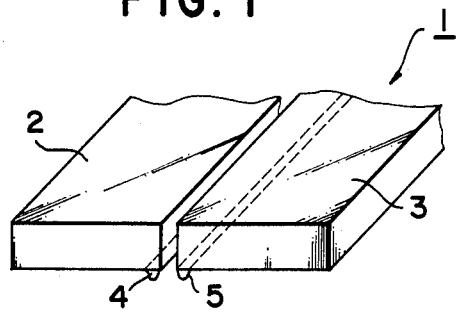
FIG. 1 is a perspective view of a longitudinally fusion-cut slab.
Figure 3:
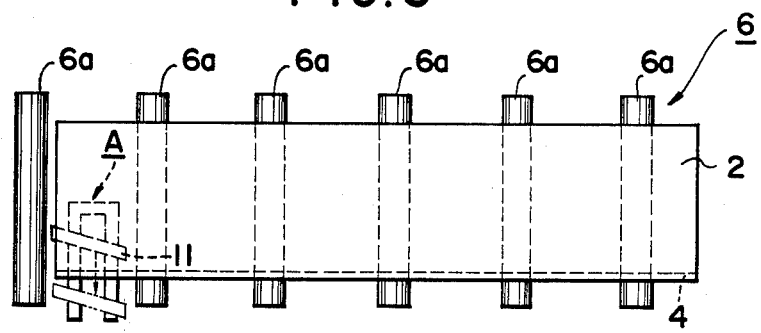
FIG. 3 is a schematic explanatory view illustrating an embodiment of the method of the present invention, in which one burr cutting machine is used.
Figure 6:
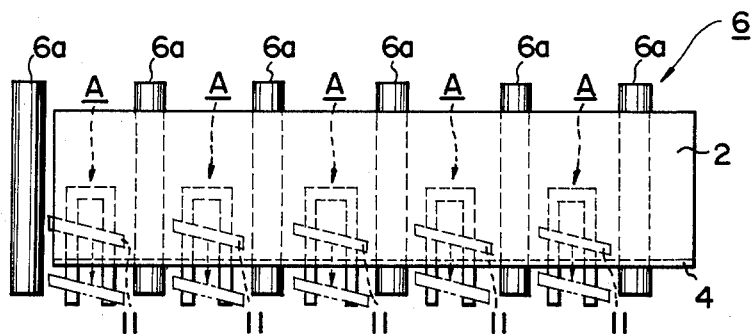
FIG. 6 is a schematic explanatory view illustrating another embodiment of the method of the present invention, in which a plurality of burr cutting machines are used.
Figure 4:
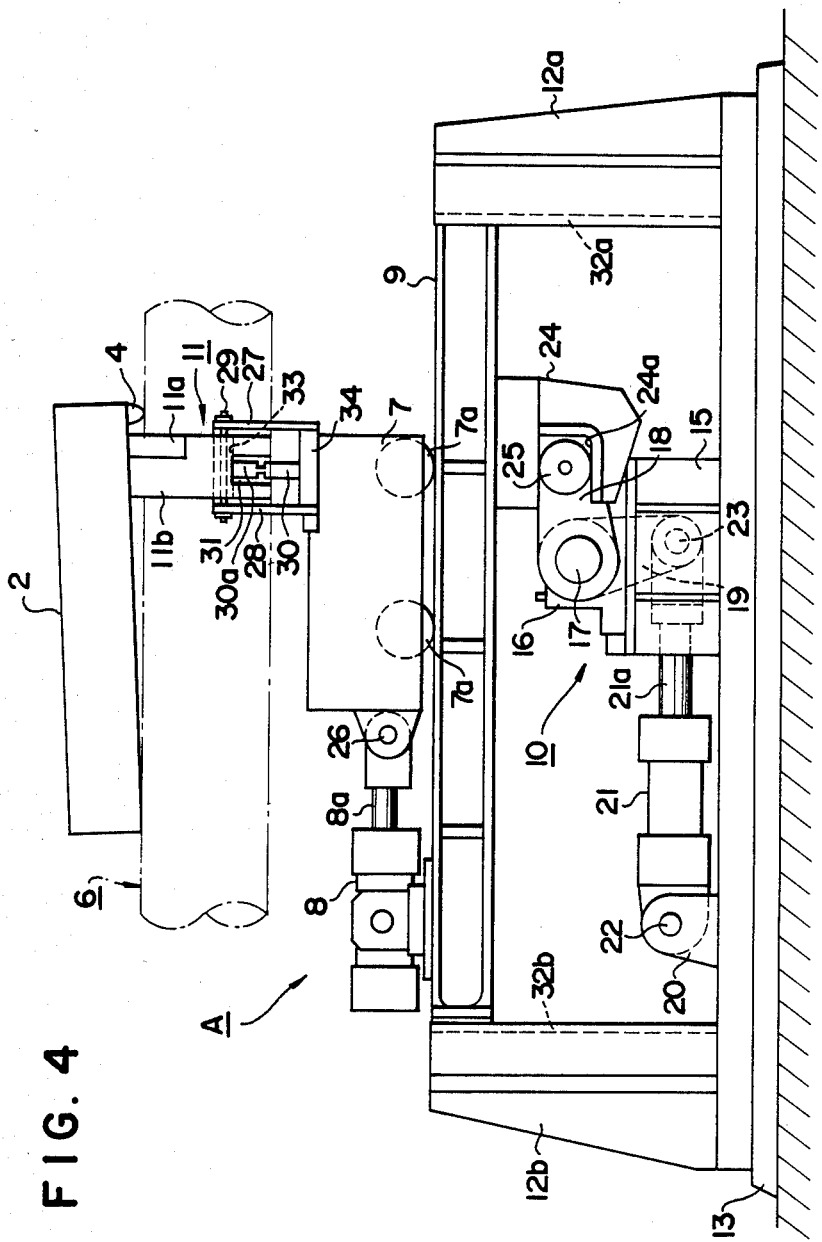
FIG. 4 is a schematic front view illustrating an embodiment of the apparatus of the present invention.
Figure 5:
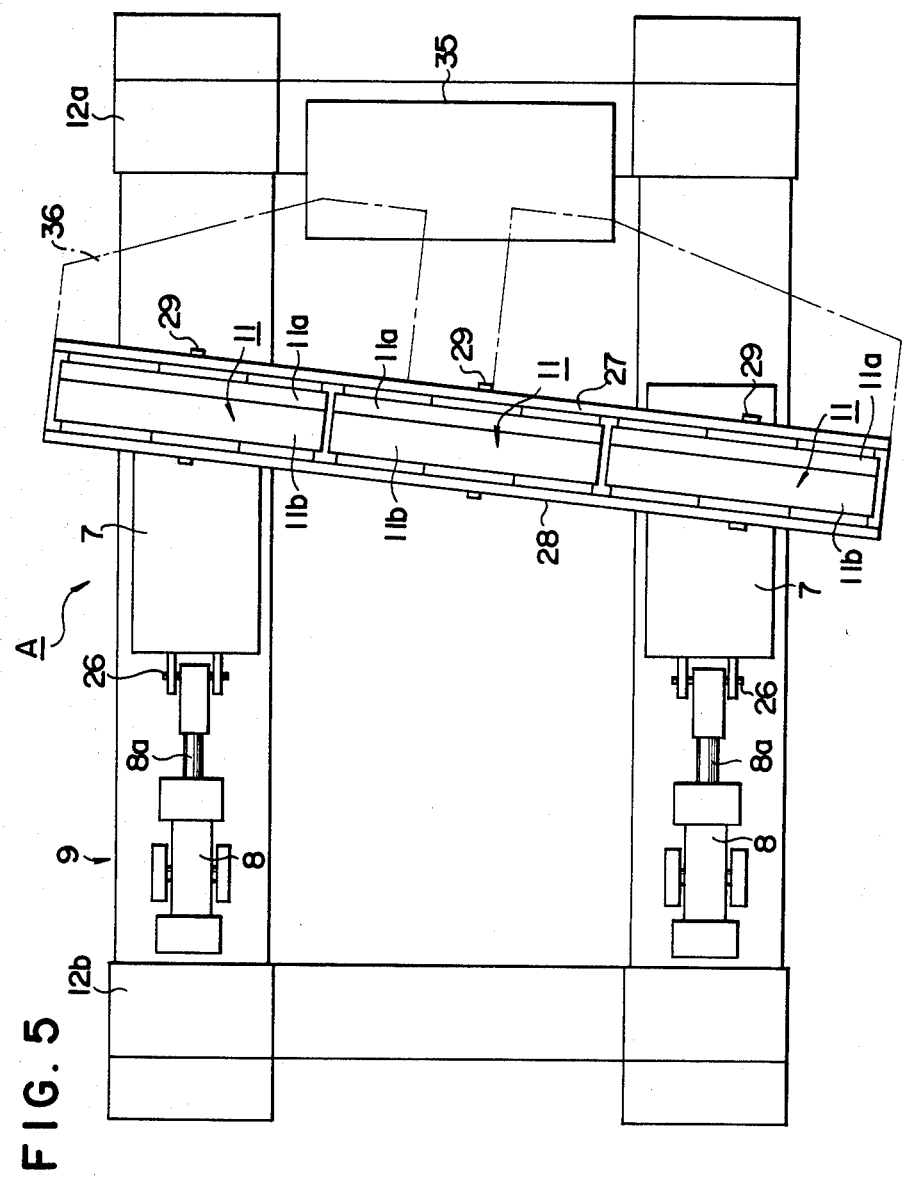
FIG. 5 is a schematic plan view of the apparatus of the present invention illustrated in FIG. 4.

FIG. 3 is a schematic explanatory view illustrating an embodiment of the method of the present invention, in which one burr cutting machine is used, FIG. 4 is a schematic front view illustrating an embodiment of the apparatus of the present invention, and FIG. 5 is a schematic plan view of the apparatus of the present invention illustrated in FIG. 4. In FIGS. 3 and 4, 6 is a roller table which comprises a plurality of rollers 6a and extends horizontally, for placing a slab 2 having a cutting burr 4 on the lower surface thereof along the fusion-cutting line with the lower surface down, and transferring the slab 2 thereon. The roller table 6 has a width capable of placing the slab 2 having the cutting burr 4 so that the line of the cutting burr 4 agrees with the travelling direction of the roller table 6. There is provided a burr cutting machine A below the roller table 6, for removing the cutting burr 4 of the slab 2.

The burr cutting machine A comprises two cutter carriages 7 horizontally moving toward the line of the cutting burr 4 of the slab 2 provided in parallel at a prescribed distance, two cutter carriage driving mechanisms 8 each connected to each of the two cutter carriages 7, a horizontal stand 9 for mounting the two cutter carriages 7 and the two cutter carriage driving mechanisms 8, and at least one stand lifting mechanism 10 fitted to the lower portion of the horizontal stand 9 for lifting the horizontal stand 9 together with the two cutter carriages 7 and the two cutter carriage driving mechanisms 8. The two cutter carriages have at the top thereof at least one cutter 11 in common, and each of the at least one cutter 11 has a knife 11a for cutting off the cutting burr 4 of the slab 2. The burr cutting machine A is arranged so that the at least one cutter 11 of the two cutter carriages 7 is directed toward the line of the cutting burr 4 of the slab 2.

Also in FIGS. 3 and 4, 12a and 12b are a pair of supporting legs vertically provided on a base 13 for guiding vertical movement of the horizontal stand 9. As shown in FIG. 4, vertical guiding grooves 32a and 32b are formed on the respective sides facing each other of the pair of supporting legs 12a and 12b, and the both sides of the horizontal stand 9 respectively engage with the guiding grooves 32a and 32b. At least one slab fixing mechanism (not shown) is provided near the burr cutting machine A, for fixing the slab 2 onto the roller table 6 during cutting off the cutting burr 4 of the slab 2.

In FIGS. 4 and 5, 27 and 28 are a pair of cutter supporting members extending over the two cutter carriages 7, and the both ends of the pair of cutter supporting members 27 and 28 are respectively fixed to the upper portions of the two cutter carriages 7. Also in the same figures, 11 is at least one cutter attached between the pair of cutter supporting members 27 and 28. Each of the at least one cutter 11 comprises a knife 11a and a knife holder 11b, and the knife 11a is secured to the knife holder 11b. As shown in FIG. 4, each of the at least one cutter 11 is attached between the pair of cutter supporting members 28 and 29 by means of a shaft 29 inserted into an elliptic hole 33 formed in each of the at least one cutter 11 so that each of the at least one cutter 11 can be vertically moved by a distance equal to a play between the elliptic hole 33 and the shaft 29.

In FIG. 4, 30 is at least one cylinder for vertically moving each of the at least one cutter 11, and each of the at least one cylinder 30 is provided substantially vertically on a fixing plate 34 fixed onto the top portion of the cutter carriages 7 so that the tip of a rod 30a of the at least one cylinder 30 is in contact with a recess 31 formed at the lower portion of each of the at least one cutter 11.

Now, the stand lifting mechanism 10 is described with reference to FIG. 4. In FIG. 4, 15 is a rack fixed onto a base 13, 16 is a bearing fixed onto the rack 15, and 17 is a shaft inserted horizontally into the bearing 16. An end of a first arm 18 extending substantially horizontally and an end of a second arm 19 extending substantially vertically are respectively fixed to the shaft 17 so that the first arm 18 and the second arm 19 form an angle of about 90° therebetween. In the same figure, 20 is a bracket fixed onto the base 13, and 21 is a cylinder connected by a shaft 22 substantially horizontally to the bracket 21, the tip of a rod 21a of the cylinder 21 being connected by a shaft 23 to the other end of the second arm 19. A jaw member 24 having a jaw-shaped engaging portion 24a is fixed to the lower portion of the horizontal stand 9, and a roller 25 fitted to the other end of the first arm 18 is engaged with the jaw-shaped engaging portion 24a of the jaw member 24. Since the stand lifting mechanism 10 has the construction as described above, it is possible to lift the horizontal stand 9 via the first arm 18 and the second arm 19, guided through the guiding groove 32a of the supporting leg 12a and the guiding groove 32b of the supporting leg 12b by causing the rod 21a to expand through actuation of the cylinder 21, and to lower the horizontal stand 9 by causing the rod 21a to contract through actuation of the cylinder 21.

Each of the two cutter carriage driving mechanisms 8 comprises a cylinder provided substantially horizontally on the upper surface of the horizontal stand 9, and the tip of a rod 8a of the cylinder thereof is connected by a shaft 26 to each of the two cutter carriages 7 having wheels 7a. It is therefore possible to forward the two cutter carriages 7 on rails (not shown) provided on the horizontal stand 9, by causing the rods 8a to expand through actuation of the two cutter carriage driving mechanisms 8, and to retreat the two cutter carriages 7 by causing the rods 8a to contract.

In FIG. 5, 35 is a container provided below the at least one cutter 11 on the side of the knife 11a thereof for containing the cutting burr cut off from the slab, and, 36 is a chute fitted over substantially the total length of the pair of cutter supporting members 27 and 28 for guiding the cutting burr cut off from the slab to the container 35.

According to the apparatus of the present invention having the construction as described above, the cutting burr which is produced when longitudinally fusion-cutting a slab and sticks to the lower surface of the slab along the fusion-cutting line, is removed as follows. The slab 2 having the cutting burr 4 is placed on the roller table 6 with the lower surface having the cutting burr 4 of the slab 2 down so that the line of the cutting burr 4 agrees with the travelling direction of the roller table 6, and the slab 2 is transferred on the roller table 6 up to the position of the burr cutting machine A. Then, the slab 2 is fixed onto the roller table 6 by the slab fixing mechanism (not shown).

Then, the horizontal stand 9 is lifted together with the two cutter carriage driving mechanisms 8 and the two cutter carriages 7 having at least one cutter 11 in common, which are mounted on the horizontal stand 9, through actuation of the stand lifting mechanism 10, and the at least one cutter 11 is lifted through actuation of the at least one cylinder 30 to bring the at least one cutter 11 into contact with the lower surface having the cutting burr 4 of the slab 2.

Then, the two cutter carriages 7 are horizontally moved, while keeping the contact with the lower surface of the slab 2, toward the line of the cutting burr 4 of the slab 2 until the at least one cutter 11 passes the line of the cutting burr 4 as shown by the arrow in FIG. 3 through actuation of the two cutter carriage driving mechanisms 8, thereby to cut off the cutting burr 4 of the slab 2 placed on the roller table 6 by a length corresponding to the total length of the knife 11a of the at least one cutter 11 by means of the knife 11a of the at least one cutter 11. The cutting burr 4 thus cut off is introduced into the container 35 through the chute 36.

Then, the at least one cutter 11 attached to the two cutter carriages 7 is lowered through actuation of the at least one cylinder 30 and the at least one stand lifting mechanism 10, and then, the two cutter carriages 7 are retreated through actuation of the two cutter carriage driving mechanisms 8. The at least one cutter 11 is thus horizontally pulled back to the original position thereof.

Then, after releasing the fixing of the slab 2, the slab 2 is forwarded on the roller table 6 in the travelling direction of the roller table 6 by a distance substantially equal to the total length of the knife 11a of the at least one cutter 11, and the cut-off of the cutting burr 4 of the slab 2 by means of the at least one cutter 11 is repeated at least once, thereby substantially completely removing the cutting burr 4 of the slab 2.

FIG. 6 is a schematic explanatory view illustrating another embodiment of the method of the present invention, in which a plurality of burr cutting machines are used. The slab 2 is placed on the roller table 6 with the lower surface having the cutting burr 4 of the slab 2 down so that the line of the burr 4 agrees with the travelling direction of the roller table 6. The plurality of burr cutting machines A are provided below the roller table 6 so that the at least one cutter 11 of each of the plurality of burr cutting machines A is directed toward the line of the cutting burr 4 of the slab 2. The plurality of burr cutting machines A are arranged along the travelling direction of the roller table 6 at intervals substantially equal to the total length of the at least one cutter 11 of the burr cutting machine A. The cutting burr 4 of the slab 2 is intermittently cut off by a length corresponding to the total length of the knife 11a of the at least one cutter 11 of each of the plurality of burr cutting machines A by lifting the at least one cutter 11 of each of the plurality of burr cutting machines A to bring the at least one cutter 11 into contact with the lower surface of the slab 2 having the cutting burr 4, and horizontally moving, while keeping the contact with the lower surface, the at least one cutter 11 toward the line of the cutting burr 4 until the at least one cutter 11 passes the line of the cutting burr 4, as shown by the arrow in FIG. 6.

Then, the slab 2 is forwarded on the roller table 6 in the travelling direction thereof by a distance substantially equal to the total length of the knife of the at least one cutter 11 of the burr cutting machine A, and the cut-off of the cutting burr 4 of the slab 2 by means of the at least one cutter 11 is repeated at least once, thereby substantially completely removing the cutting burr 4 of the slab 2 at a high efficiency.

FIG. 7 is a schematic explanatory view illustrating further another embodiment of the method of the present invention, in which one burr cutting machine is used, FIG. 8 is a schematic front view illustrating another embodiment of the apparatus of the present invention, and FIG. 9 is a schematic plan view of the apparatus of the present invention illustrated in FIG. 8. In this embodiment, the roller table 6 has a width capable of parallelly placing thereon a first slab 2 and a second slab 3 each having the cutting burr so that the line of the cutting burr 4 of the first slab 2 and the line of the cutting burr 5 of the second slab 3 closely face each other with the axial line of the roller table 6 in between. The burr cutting machine A is arranged below the roller table 6 along the axial line of the roller table 6 so that the at least one cutter 11 of the burr cutting machine A is directed toward the lines of the cutting burrs (4, 5) of the first and the second slabs (2, 3). Each of the at least one cutter 11 of the burr cutting machine A has, as shown in FIGS. 8 and 9, a first knife 11c and a second knife 11d having the same length, and the first knife 11c and the second knife 11d are fixed to a knife holder 11b (not shown).

At least one first slab lifting mechanism 37 and at least one second slab lifting mechanism 38 are arranged below the roller table 6 on the both sides of the axial line of the roller table 6, as shown in FIGS. 7 and 8, for independently and selectively lifting the first slab 2 and the second slab 3 placed on the roller table 6 from the roller table 6 and lowering onto the roller table 6. At least one first slab fixing mechanism 40 and at least one second slab fixing mechanism 39 are arranged near the burr cutting machine A, for independently and selectively fixing the first slab 2 and the second slab 3 placed on the roller table 6 onto the roller table 6.

Since the construction of the burr cutting machine A in this embodiment is the same as that of the burr cutting machine shown in FIGS. 4 and 5 except that the cutter 11 comprises the first knife 11c and the second knife 11d having the same length, description thereof is omitted here. In FIG. 9, 35 and 35' are containers, provided below the at least one cutter 11 on the both sides of the at least one cutter 11, for containing cutting burrs (4, 5) cut off from the first and the second slabs (2, 3), and 36 and 36' are chutes fitted over substantially the total length of the pair of cutter supporting members 27 and 28 for guiding the cutting burrs (4, 5) cut off from the first and the second slabs (2, 3) to the containers 35 and 35'.

According to the apparatus of the present invention having the construction as described above, the cutting burr 4 of the first slab 2 and the cutting burr 5 of the second slab 3 are removed as follows. The first slab 2 having the cutting burr 4 on the lower surface thereof and the second slab 3 having the cutting burr 5 on the lower surface thereof are parallelly placed on the roller table 6 with the lower surfaces having the cutting burrs down so that the line of the cutting burr 4 of the first slab 2 and the line of the cutting burr 5 of the second slab 3 closely face each other with the axial line of the roller table 6 in between, and the first slab 2 and the second slab 3 are transferred on the roller table 6 up to the position of the burr cutting machine A. As shown in FIGS. 7 and 8, the first slab 2 is fixed onto the roller table 6 via the second slab 3 by horizontally forwarding the at least one first slab fixing mechanism 40 provided on the side of the second slab 3 toward the side edge 3a of the second slab 3, and bearing the second slab 3 against the first slab 2.

Then, the second slab 3 is lifted from the roller table 6 by means of the at least one second slab lifting mechanism 38 so that the lowermost end of the cutting burr 5 of the second slab 3 reaches at least the level flush with the lower surface of the first slab 2. Then, as has been described with regard to the apparatus shown in FIGS. 4 and 5, the at least one cutter 11 of the burr cutting machine A is lifted to bring the at least one cutter 11 into contact with the lower surface of the first slab 2 having the cutting burr 4, and then horizontally moved, while keeping the contact with the lower surface of the first slab 2, toward the line of the cutting burr 4 of the first slab 2 until the at least one cutter 11 passes the line of the cutting burr 5 of the second slab 3, thereby cutting off a part of the cutting burr 4 of the first slab 2 by a length corresponding to the total length of the first knife 11c of the at least one cutter 11 by means of the first knife 11c of the at least one cutter 11.

Then, after lowering the second slab 2 onto the roller table 6 by means of the at least one second slab lifting mechanism 38 and releasing the fixing of the first slab 2 by retreating the at least one first slab fixing mechanism 40, the second slab 3 is fixed onto the roller table 6 via the first slab 2, by horizontally forwarding the at least one second slab fixing mechanism 39 provided on the side of the first slab 2 toward the side edge 2a of the first slab 2 and bearing the first slab 2 against the second slab 3.

Then, the first slab 2 is lifted from the roller table 6 by means of the at least one first slab lifting mechanism 37 so that the lower surface of the first slab 2 reaches at least the level flush with the lower surface of the second slab 3. Then, the at least one cutter 11 of the burr cutting machine A is horizontally pull back, while keeping the contact with the lower surface of the second slab 3, toward the line of the cutting burr 5 of the second slab 3 until the at least one cutter 11 passes the line of the cutting burr 4 of the first slab 2, thereby cutting off a part of the cutting burr 5 of the second slab 3 by a length corresponding to the total length of the second knife 11d of the at least one cutter 11 by means of the second knife 11d of the at least one cutter 11.

Then, after lowering the first slab 2 onto the roller table 6 by means of the at least one first slab lifting mechanism 37 and releasing the fixing of the second slab 3 by retreating the at least one second slab fixing mechanism 39, the first slab 2 and the second slab 3 are forwarded on the roller table 6 in the travelling direction of the roller table 6 by a distance substantially equal to the total length of the knife of the at least one cutter 11. The cut-off of the cutting burr 4 of the first slab 2 and the cutting burr 5 of the second slab 3 by means of the at least one cutter 11 is repeated at least once, thereby substantially completely removing the cutting burr 4 of the first slab 2 and the cutting burr 5 of the second slab 3. The cutting burr 4 cut off from the first slab 2 is contained through the chute 36 in the container 35, and the cutting burr 5 cut off from the second slab 3 is contained through the at least one chute 36' in the container 35'. According to the above-mentioned method and apparatus, it is possible to remove at a high efficiency the cutting burr 4 of the first slab 2 and the cutting burr 5 of the second slab 3 by forwarding and retreating the at least one cutter 11 of the burr cutting machine A.

FIG. 10 is a schematic explanatory view illustrating further another embodiment of the method of the present invention, in which a plurality of burr cutting machines are used. The first slab 2 having the cutting burr 4 on the lower surface thereof and the second slab 3 having the cutting burr 5 on the lower surface thereof are parrallelly placed on the roller table 6 with the lower surfaces having the cutting burrs (4, 5) of the first and the second slabs (2, 3) down so that the line of the cutting burr 4 of the first slab 2 and the line of the cutting burr 5 of the second slab 3 closely face each other with the axial line of the roller table 6 in between. The plurality of burr cutting machines A each having at least one cutter 11 are provided below the roller table 6 along the axial line of the roller table 6 so that the at least one cutter 11 of each of the plurality of burr cutting machines A is directed toward the lines of the cutting burrs (4, 5) of the first and the second slabs (2, 3). The plurality of burr cutting machines A are arranged along the axial line of the roller table 6 at intervals substantially equal to the total length of the at least one cutter 11 of the burr cutting machine A. Each of the at least one cutter 11 of each of the plurality of the burr cutting machines A has a first knife 11c and a second knife 11d having the same length. The cutting burr 4 of the first slab 2 and the cutting burr 5 of the second slab 3 are intermittently cut off by a length corresponding to the total length of the knife of the at least one cutter 11 of each of the plurality of burr cutting machines A by lifting the at least one cutter 11 of the plurality of burr cutting machines A to bring the at least one cutter 11 into contact with the lower surface of the first slab 2 having the cutting burr 4, horizontally moving, while keeping the contact with the lower surface of the first slab 2, the at least one cutter 11 toward the line of the cutting burr 4 of the first slab 2 until the at least one cutter 11 passes the line of the cutting burr 5 of the second 3, and then, retreating the at least one cutter 11, while keeping the contact with the lower surface of the second slab 3, toward the line of the cutting burr 5 of the second slab 3 until the at least one cutter 11 passes the line of the cutting burr 4 of the first slab 2.

Then, the slab 2 and slab 3 are forwarded on the roller table 6 in the travelling direction thereof by a distance substantially equal to the total length of the knife of the at least one cutter 11 of the burr cutting machine A, and the cut-off of the cutting burrs (4, 5) of the first and the second slabs (2, 3) by means of the at least one cutter 11 is repeated at least once, thereby substatially completely removing the cutting burrs (4, 5) of the first and the second slabs (2, 3) at a high efficiency.

According to the method and the apparatus for removing a cutting burr sticking to the lower surface of a slab of the present invention, as described above in detail, it is possible to remove at a high efficiency a cutting burr produced when longitudinally fusion-cutting a slab and sticking to the lower surface of the slab along the fusion-cutting line, and hence to improve the productivity of slabs, thus providing many industrially useful effects.

What is claimed is:

1. A method for removing a cutting burr produced when longitudinally fusion-cutting a slab and sticking to the lower surface of said slab along the fusion-cutting line, which comprises the steps of:

placing at least one slab each having said cutting burr on a roller table extending horizontally with the lower surface having said cutting burr of said at least one slab down; fixing said at least one slab onto said roller table; lifting at least one cutter of at least one burr cutting machine provided below said roller table to bring said at least one cutter into contact with said lower surface having said cutting burr of said at least one slab; and horizontally moving said at least one cutter toward the line of said cutting burr of said at least one slab while keeping said contact with said lower surface to cut off said cutting burr by means of a knife of said at least one cutter;

characterized by:

placing a slab having said cutting burr on said roller table so that the line of said cutting burr agrees with the travelling direction of said roller table;

transferring said slab on said roller table up to the position of said at least one burr cutting machine, and fixing said slab onto said roller table;

horizontally moving said at least one cutter of said at least one burr cutting machine toward the line of said cutting burr of said slab in the direction intersecting the travelling direction of said roller table substantially at right angles until said at least one cutter passes the line of said cutting burr, to cut off a part of said cutting burr of said slab by a length corresponding to the total length of a knife of said at least one cutter by means of said knife of said at least one cutter, and horizontally pulling said at least one cutter back to the original position thereof;

after releasing said fixing of said slab, forwarding said slab on said roller table in the travelling direction of said roller table by a distance substantially equal to said total length of said knife of said at least one cutter; and, repeating at least once said cut-off of said cutting burr of said slab by means of said at least one cutter, thereby substantially completely removing said cutting burr of said slab.

2. A method for removing a cutting burr produced when longitudinally fusion-cutting a slab and sticking to the lower surface of said slab along the fusion-cutting line, which comprises the steps of:

placing at least one slab each having said cutting burr on a roller table extending horizontally with the lower surface having said cutting burr of said at least one slab down; fixing said at least one slab onto said roller table; lifting at least one cutter of at least one burr cutting machine provided below said roller table to bring said at least one cutter into contact with said lower surface having said cutting burr of said at least one slab; and horizontally moving said at least one cutter toward the line of said cutting burr of said at least one slab while keeping said contact with said lower,surface to cut of said cutting burr by means of a knife of said at least one cutter;

characterized by:

parallelly placing a first slab and a second slab each having said cutting burr on said roller table so that the line of said cutting burr of said first slab and the line of said cutting burr of said second slab closely face each other with the axial line of said roller table in between;

transferring said first slab and said second slab on said roller table up to the position of said at least one burr cutting machine each provided with at least one cutter each having a first knife and a second knife equal in length, and fixing said first slab onto said rollerr table;

lifting said second slab from said roller table so that the lowermost end of said cutting burr of said second slab reaches at least the level flush with the lower surface of said first slab;

horizontally moving said at least one cutter of said at least one burr cutting machine toward the line of said cutting burr of said first slab in the direction intersecting the travelling direction of said roller table substantially at right angles until said at least one cutter passes the line of said cutting burr of said second slab, to cut off a part of said cutting burr of said first slab by a length corresponding to the total length of said first knife of said at least one cutter by means of said first knife of said at least one cutter;

lowering said second slab onto said roller table, and fixing said second slab onto said roller table;

after releasing said fixing of said first slab, lifting said first slab from said roller table so that the lower surface of said first slab reaches at least the level flush with the lower surface of said second slab;

horizontally pulling back said at least one cutter of said at least one burr cutting machine toward the line of said cutting burr of said second slab in the direction intersecting the travelling direction of said roller table substantially at right angles until said at least one cutter passes the line of said cutting burr of said first slab, to cut off a part of said cutting burr of said second slab by a length corresponding to the total length of said second knife of said at least one cutter by means of said second knife of said at least one cutter;

lowering said first slab onto said roller table;

after releasing said fixing of said second slab, forwarding said first slab and said second slab on said roller table in the travelling direction of said roller table by a distance substantially equal to said total length of said knife of said at least one cutter; and, repeating at least once said cut-off of said cutting burrs of said first slab and said second slab by means of said at least one cutter, thereby substantially completely removing said cutting burrs of said first slab and said second slab.

3. An apparatus for removing a cutting burr produced when longitudinally fusion-cutting a slab and sticking to the lower surface of said slab along the fusion-cutting line, which comprises:

a roller table comprising a plurality of rollers and horizontally extending, for placing at least one slab each having said cutting burr with the lower surface having said cutting burr of said at least one slab down and transferring same;

at least one burr cutting machine provided below said roller table for removing said cutting burr of said at least one slab, each of said at least one burr cutting machine comprising at least one cutter carriage horizontally moving toward the line of said cutting burr of said at least one slab, at least one cutter carriage driving mechanism each connected to said at least one cutter carriage, a horizontal stand for mounting said at least one cutter carriage and said at least one cutter carriage driving mechanism, and, at least one stand lifting mechanism fitted to the lower portion of said horizontal stand for lifting said horizontal stand together with said at least one cutter carriage and said at least one cutter carriage driving mechanism, said at least one cutter carriage having at the top thereof at least one cutter in common, each of said at least one cutter having at least one knife for cutting off said cutting burr of said at least one slab; and, at least one slab fixing mechanism for fixing said at least one slab onto said roller table during cutting off said cutting burr of said at least one slab;

characterized by comprising:

said roller table (6) having a width capable of placing a slab (2) having said cutting burr (4) so that the line of said cutting burr (4) agrees with the travelling direction of said roller table (6);

said at least one burr cutting machine (A) being arranged so that said at least one cutter (11) of said at least one burr cutting machine (A) is moved toward the line of said cutting burr (4) of said slab (2) in the direction intersecting the travelling direction of said roller table (6) substantially at right angles ; and, each of said at least one cutter (11) having a knife (11a), each of said at least one cutter (11) being adapted to cut off a part of said cutting burr (4) of said slab (2) by a length corresponding to the total length of said knife (11a) of said at least one cutter by means of said knife (11a) of said at least one cutter (11) when horizontally moving said at least one cutter (11) toward the line of said cutting burr (4) of said slab (2) in the direction intersecting the travelling direction of said roller table (6) substantially at right angles until said at least one cutter (11) passes the line of said burr (4).

4. An apparatus for removing a cutting burr produced when longitudinally fusion-cutting a slab and sticking to the lower surface of said slab along the fusion-cutting line, which comprises:

a roller table comprising a plurality of rollers and horizontally extending, for placing at least one slab, each having said cutting burr with the lower surface having said cutting burr of said at least one slab down and transferring same;

at least one burr cutting machine provided below said roller table for removing said cutting burr of said at least one slab, each of said at least one burr cutting machine comprising at least one cutter carriage horizontally moving toward the line of said cutting burr of said at least one slab, at least one cutter carriage driving mechanism each connected to said at least one cutter carriage, a horizontal stand for mounting said at least one cutter carriage and said at least one cutter carriage driving mechanism, and, at least one stand lifting mechanism fitted to the lower portion of said horizontal stand for lifting said horizontal stand together with said at least one cutter carriage and said at least one cutter carriage driving mechanism, said at least one cutter carriage having at the top thereof at least one cutter in common, each of said at least one cutter having at least one knife for cutting off said cutting burr of said at least one slab; and, at least one slab fixing mechanism for fixing said at least one slab onto said roller table during cutting off said cutting burr of said at least one slab;

characterized by comprising:

said roller table (6) having a width capable of parallelly placing thereon a first slab (2) and a second slab (3) each having said cutting burr so that the line of said cutting burr (4) of said first slab (2) and the line of said cutting burr (5) of said second slab (3) closely face each other with the axial line of said roller table (6) in between;

said at least one burr cutting machine (A) being arranged along the axial line of said roller table (6) so that said at least one cutter (11) of said at least one burr cutting machine (A) is moved toward the lines of said cutting burrs (4, 5) of said first and said second slabs (2, 3) in the direction intersecting the travelling direction of said roller table (6) substantially at right angles;

each of said at least one cutter (11) having a first knife (11c) and a second knife (11d), each of said at least one cutter (11) being adapted to cut off a part of said cutting burr (4) of said first slab (2) by a length corresponding to the total length of said first knife (11c) of said at least one cutter (11) by means of said first knife (11c) of said at least one cutter (11) when horizontally moving said at least one cutter (11) toward the line of said cutting burr (4) of said first slab (2) in the direction intersecting the travelling direction of said roller table (6) substantially at right angles until said at least one cutter (11) passes the line of said cutting burr (5) of said second slab (3), and to cut off a part of said cutting burr (5) of said second slab (3) by a length corresponding to the total length of said second knife (11d) of said at least one cutter (11) by means of said second knife (11d) of said at least one cutter (11) when horizontally pulling back said at least one cutter (11) toward the line of said cutting burr (5) of said second slab (3) in the direction intersecting the travelling direction of said roller table (6) substantially at right angles until said at least one cutter (11) passes the line of said cutting burr (4) of said first slab (2);

at least one first slab lifting mechanism (37) and at least one second slab lifting mechanism (38) provided below said roller table (6) for independently and selectively lifting said first slab.(2) and said second slab (3) placed on said roller table (6) from said roller table (6) and lowering same onto said roller table (6), said at least one first slab lifting mechanism (37) and said at least one second slab lifting mechanism (38) being arranged respectively on the both sides of the axial line of said roller table (6), said at least one second slab lifting mechanism (38) being adapted to lift, when cutting off said cutting burr (4) of said first slab (2), said second slab (3) from said roller table (6) so that the lowermost end of said cutting burr (5) of said second slab (2) reaches at least the level flush with the lower surface of said first slab (2), and said at least one first slab lifting mechanism (37) being adapted to lift, when cutting off said cutting burr (5) of said second slab (3), said first slab (2) from said roller table (6) so that the lower surface of said first slab (2) reaches at least the level flush with the lower surface of said second slab (3); and, said at least one slab fixing mechanism comprising at least one first slab fixing mechanism (40) and at least one second slab fixing mechanism (39), said at least one first slab fixing mechanism (40) and said at least one second slab fixing mechanism (39) being arranged respectively on the both sides of the axial line of said roller table (6), said at least one first slab fixing mechanism (40) and said at least one second slab fixing mechanism (39) being adapted to independently and selectively fix said first slab (2) and said second slab (3) onto said roller table (6), said at least one first slab fixing mechanism (40) being adapted to fix, when cutting off said cutting burr (4) of said first slab (2), said first slab (2) onto said roller table (6), and said at least one second slab fixing mechanism (39) being adapted to fix, when cutting off said cutting burr (5) of said second slab (3), said second slab (3) onto said roller table (6).

* * * * *